(Model.)

10 Sheets—Sheet 1.

R. O'NEILL.
AUTOMATIC GILL NET PULLER.

No. 423,627. Patented Mar. 18, 1890.

WITNESSES:
Phil C. Dieterich.
C. Sedgwick.

INVENTOR:
R. O'Neill
Munn &Co.
ATTORNEYS.

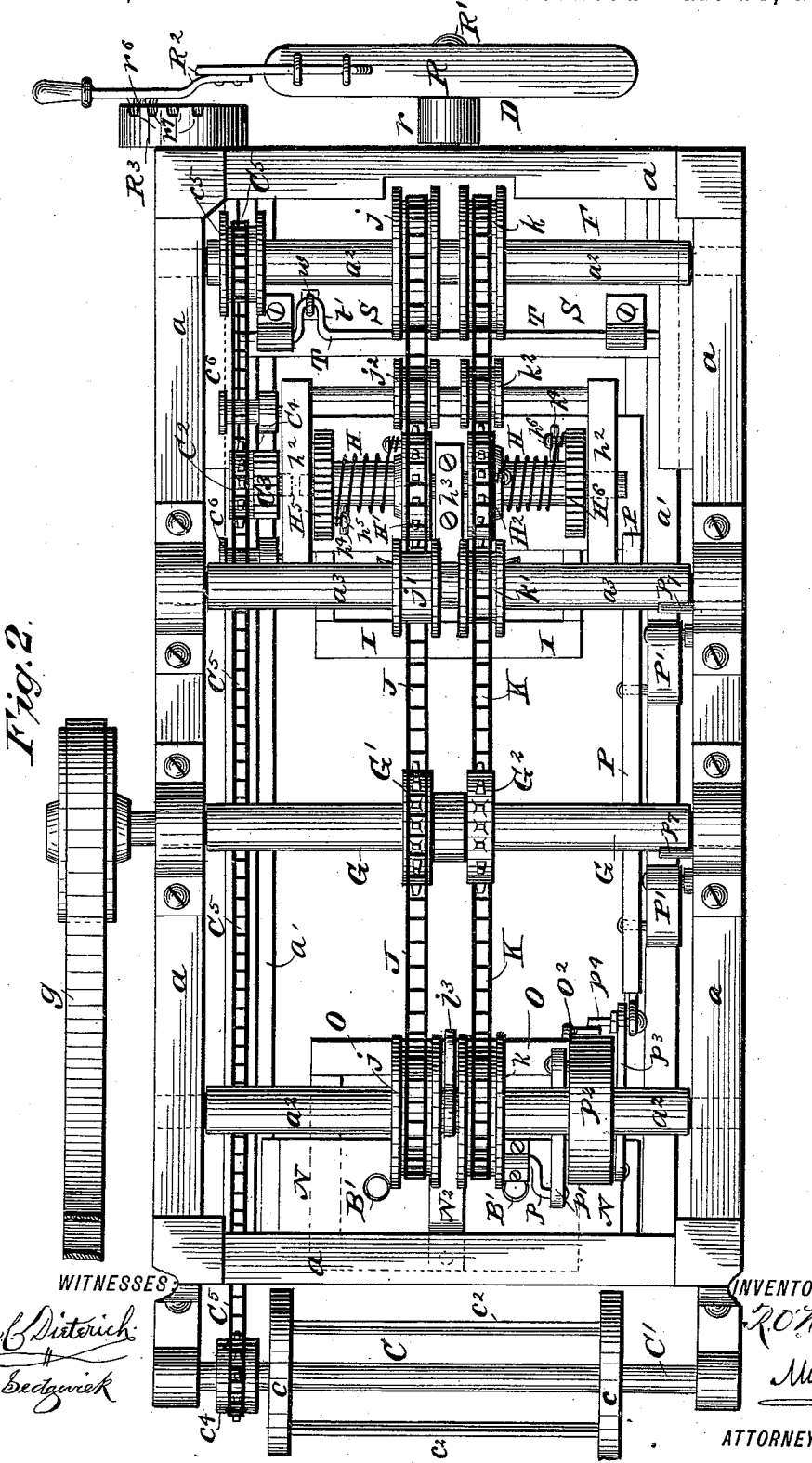

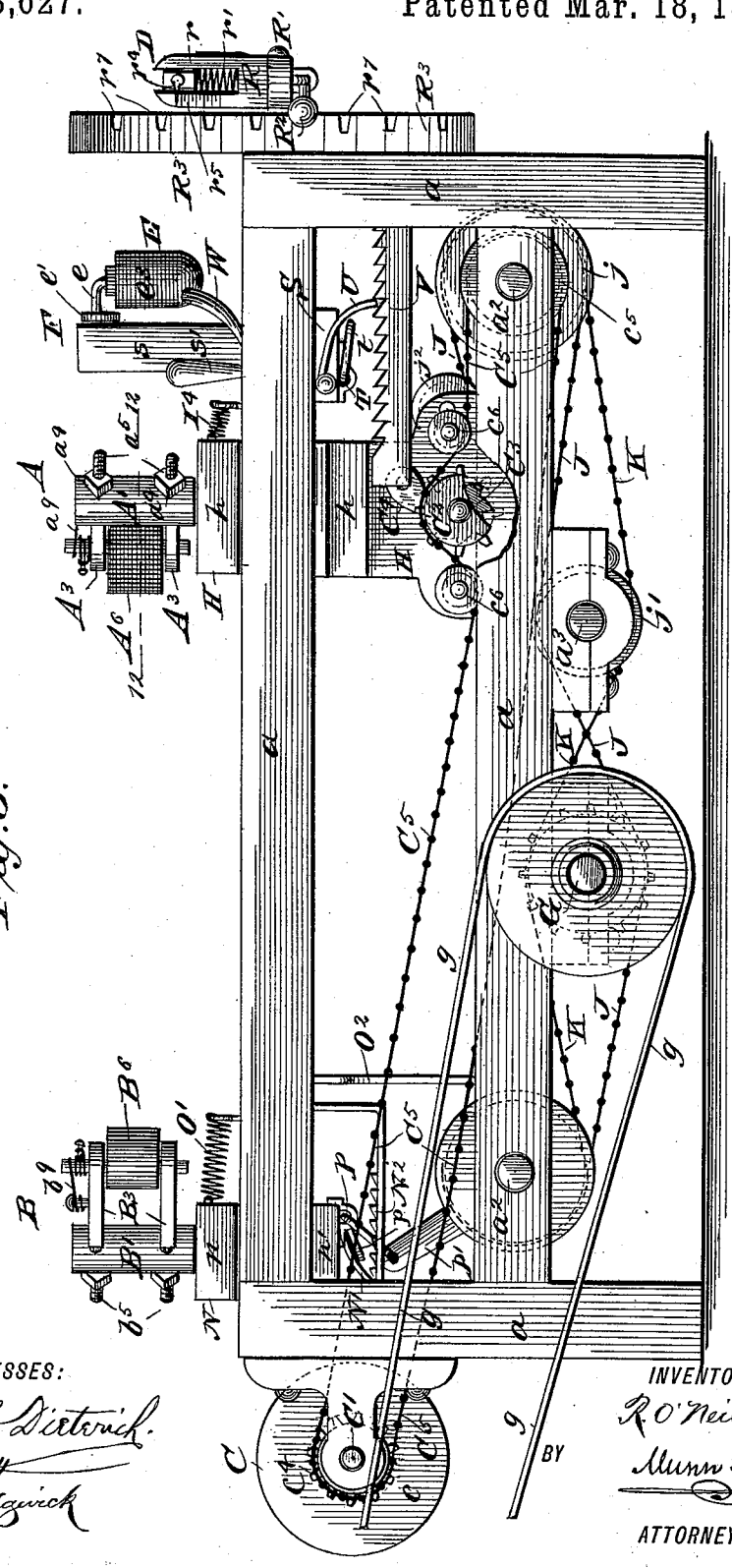

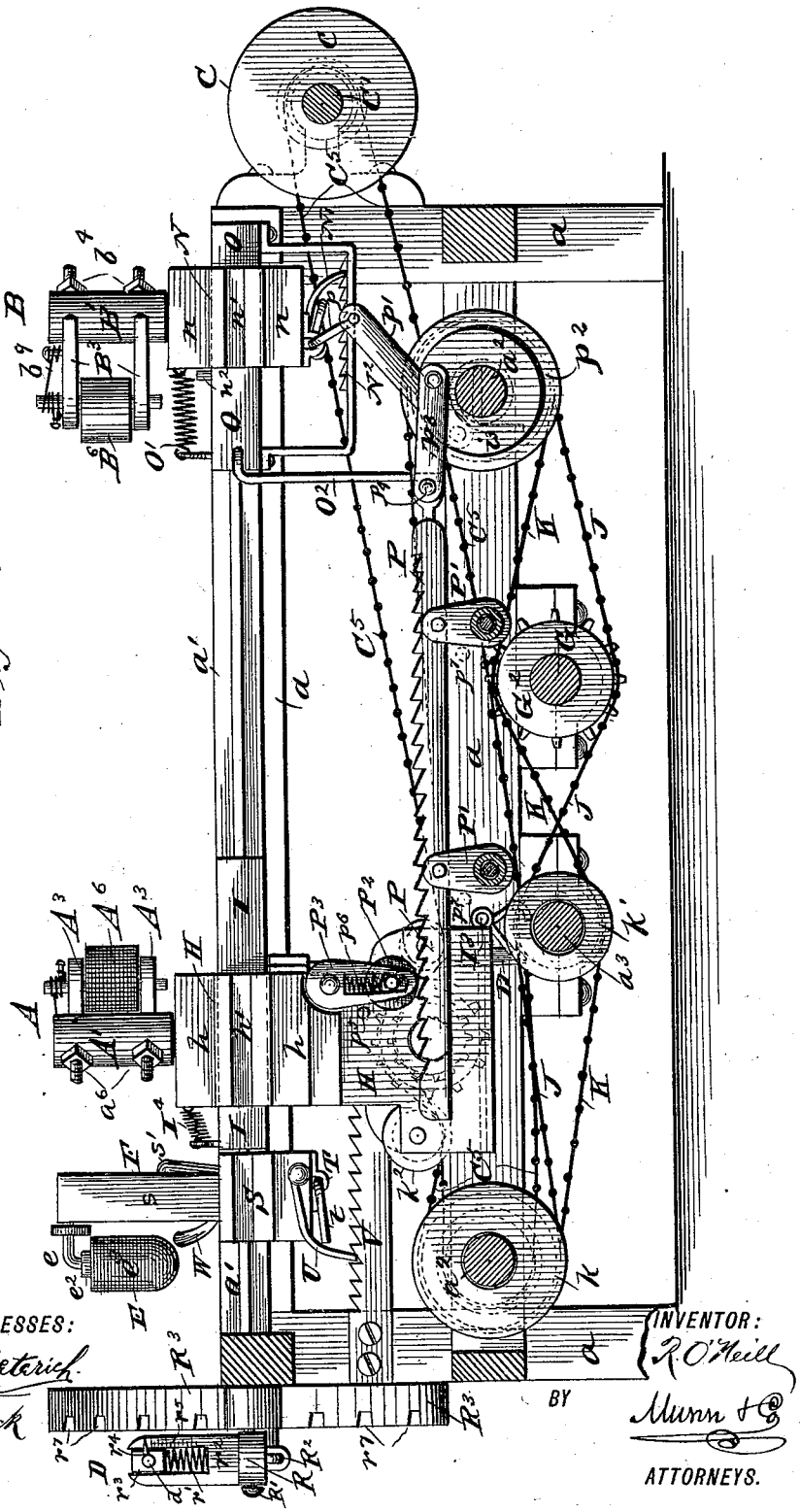

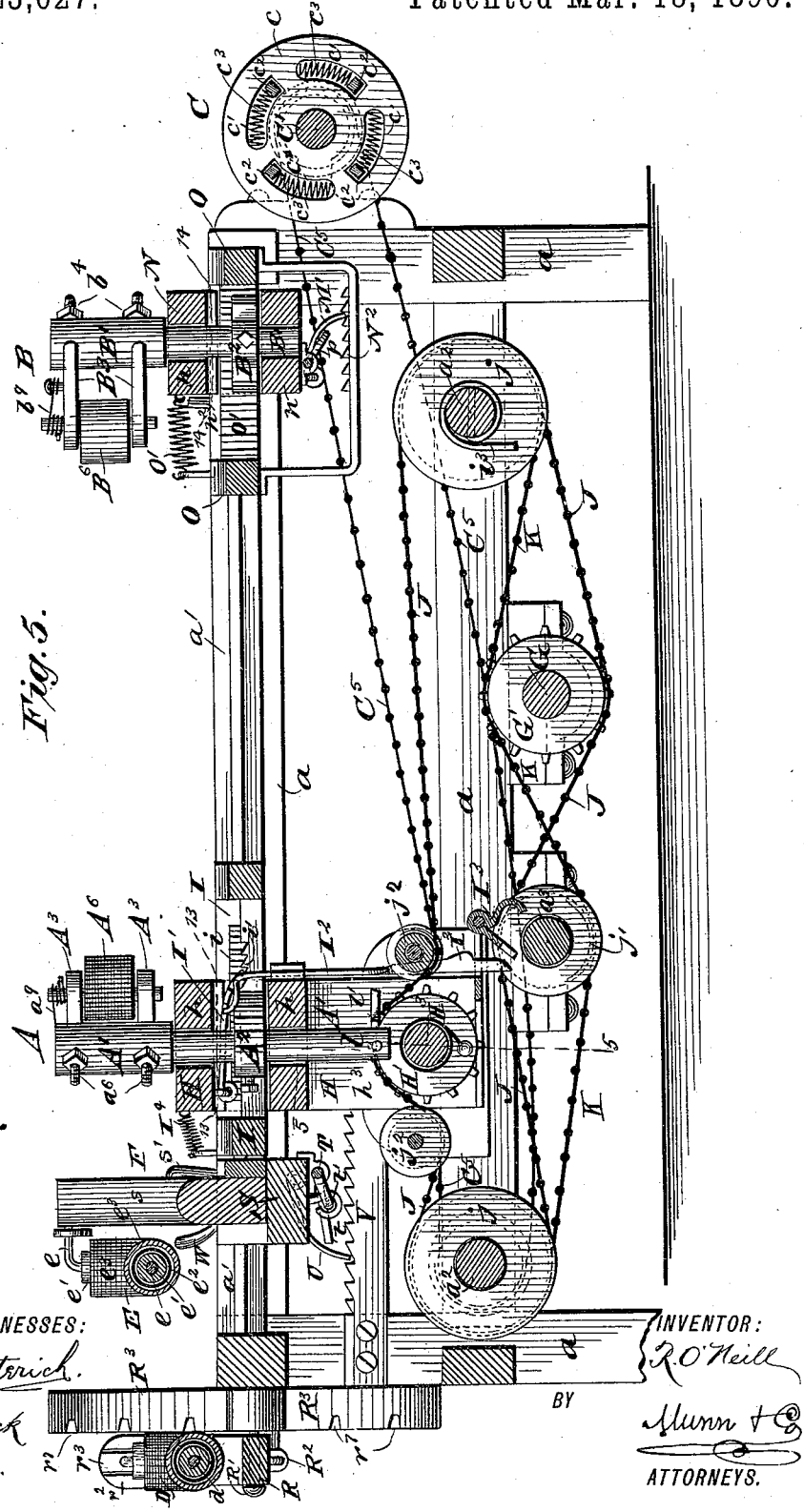

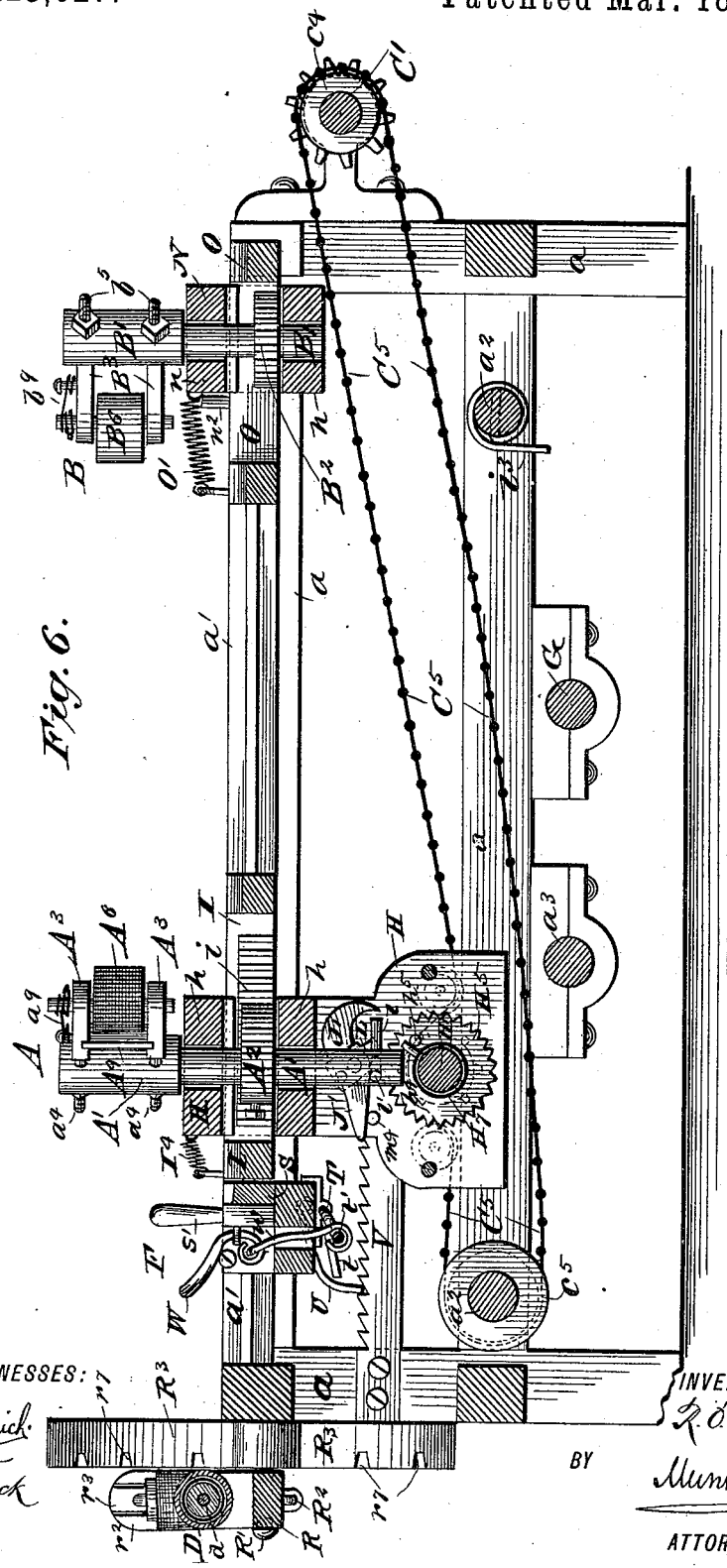

(Model.)
10 Sheets—Sheet 7.
R. O'NEILL.
AUTOMATIC GILL NET PULLER.
No. 423,627.
Patented Mar. 18, 1890.
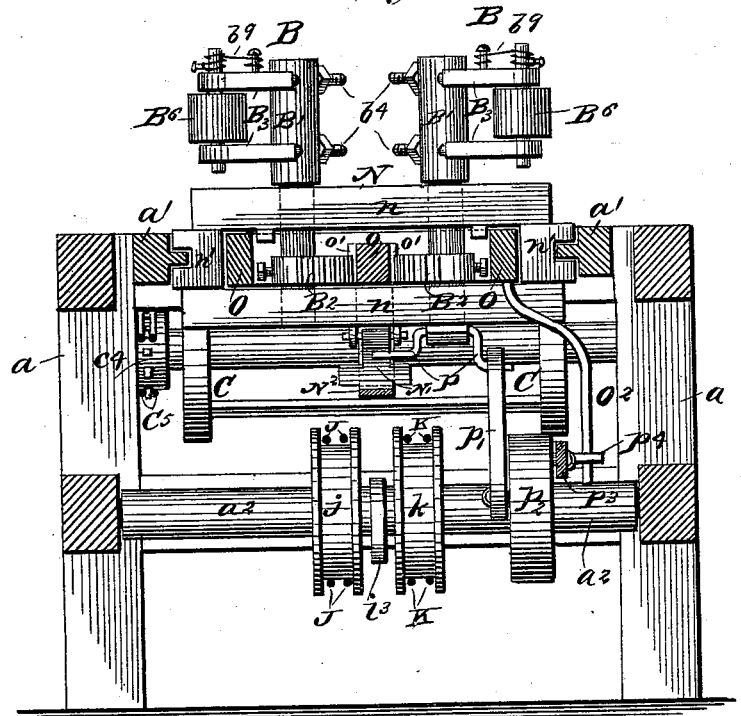
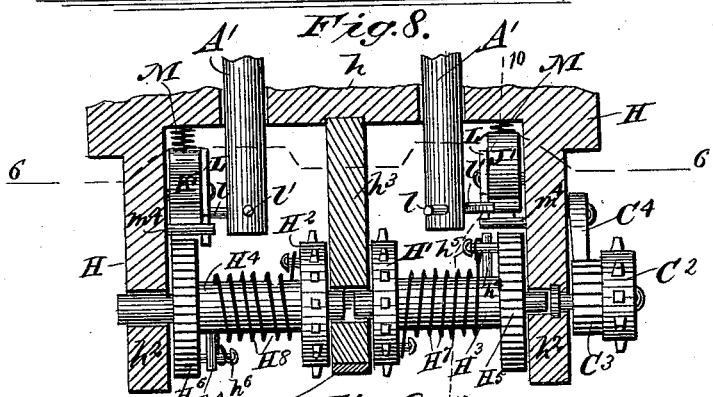
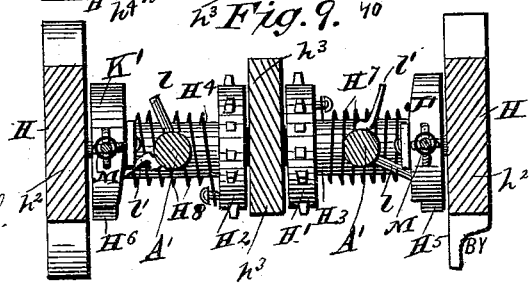
WITNESSES:
INVENTOR:
R. O'Neill
Munn & Co.
ATTORNEYS.

(Model.) 10 Sheets—Sheet 8.

R. O'NEILL,
AUTOMATIC GILL NET PULLER.

No. 423,627. Patented Mar. 18, 1890.

WITNESSES:
Phil C. Dieterich
C. Sedgwick

INVENTOR:
R. O'Neill
BY Munn & Co.
ATTORNEYS.

(Model.)
R. O'NEILL.
AUTOMATIC GILL NET PULLER.
No. 423,627.
10 Sheets—Sheet 9.
Patented Mar. 18, 1890.
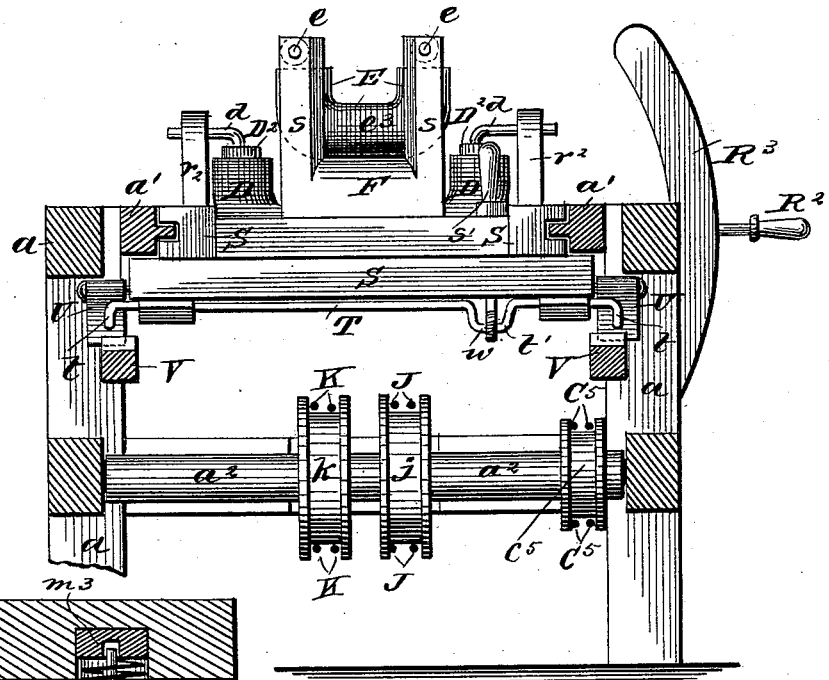
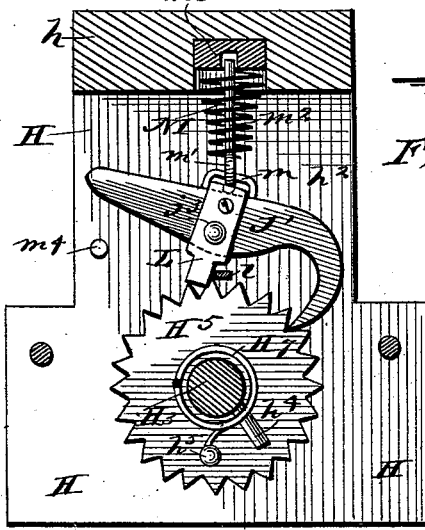
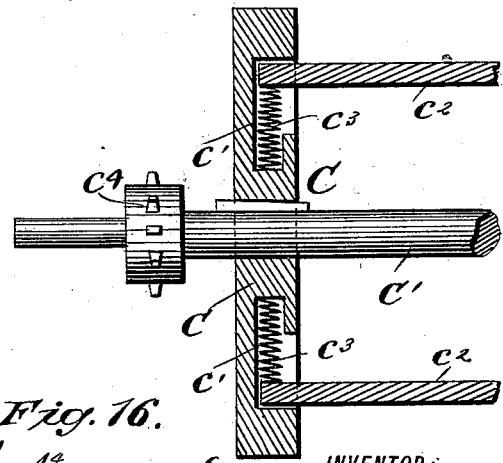
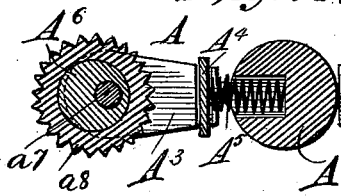
WITNESSES:
Phil C. Dieterich.
C. Sedgwick
INVENTOR:
R. O'Neill
BY Munn & Co.
ATTORNEYS.

(Model.) 10 Sheets—Sheet 10.
R. O'NEILL.
AUTOMATIC GILL NET PULLER.
No. 423,627. Patented Mar. 18, 1890.
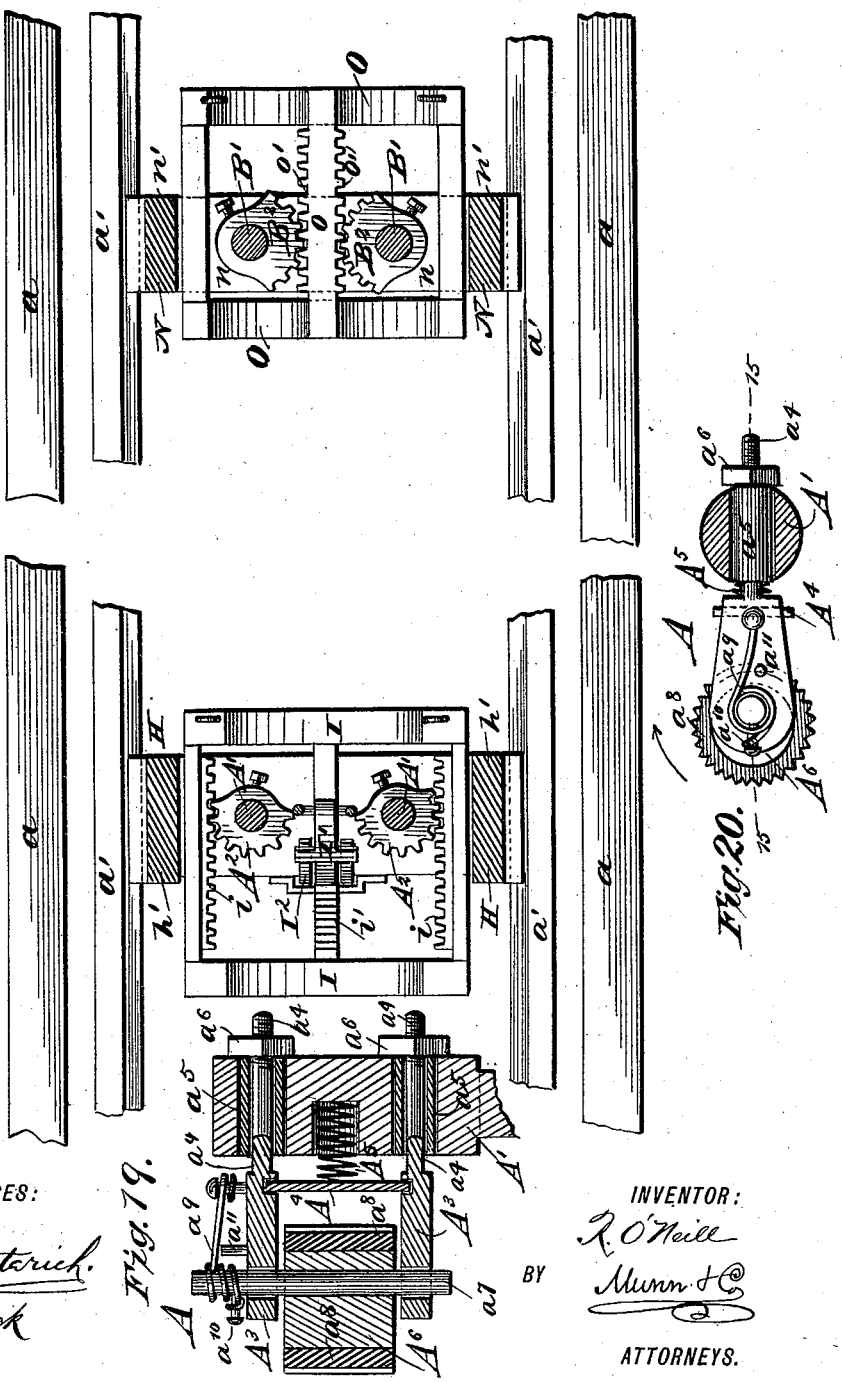
WITNESSES:
Phil. C. Dietrich.
C. Sedgwick
INVENTOR:
R. O'Neill
BY Munn & Co.
ATTORNEYS.

UNITED STATES PATENT OFFICE.

ROBERT O'NEILL, OF CHARLEVOIX, MICHIGAN.

AUTOMATIC GILL-NET PULLER.

SPECIFICATION forming part of Letters Patent No. 423,627, dated March 18, 1890.

Application filed January 30, 1889. Serial No. 298,075. (Model.)

*To all whom it may concern:*

Be it known that I, ROBERT O'NEILL, of Charlevoix, in the county of Charlevoix and State of Michigan, have invented a new and Improved Automatic Gill-Net Puller, of which the following is a full, clear, and exact description.

My invention relates to a machine for pulling or hauling gill-nets or set-lines from the water, and which is intended more especially for use on shipboard.

The invention has for its object to provide an efficient, durable, and labor-saving apparatus of this character.

The invention consists in certain novel features of construction and combinations of parts of the machine, all as hereinafter described and claimed.

Reference is to be had to the accompanying drawings, forming a part of this specification, in which similar letters of reference indicate corresponding parts in all the figures.

Figure 1:
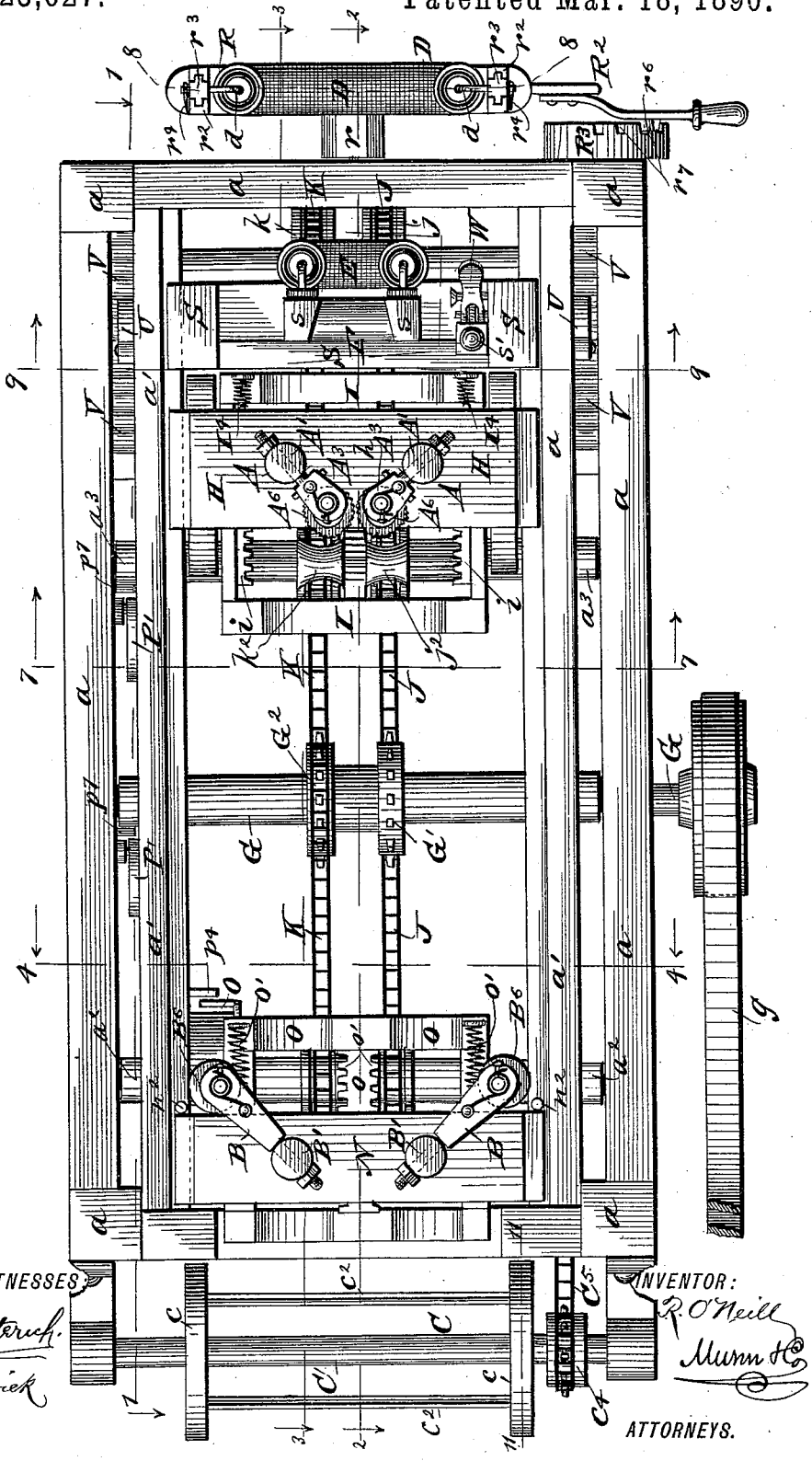
Figure 10:
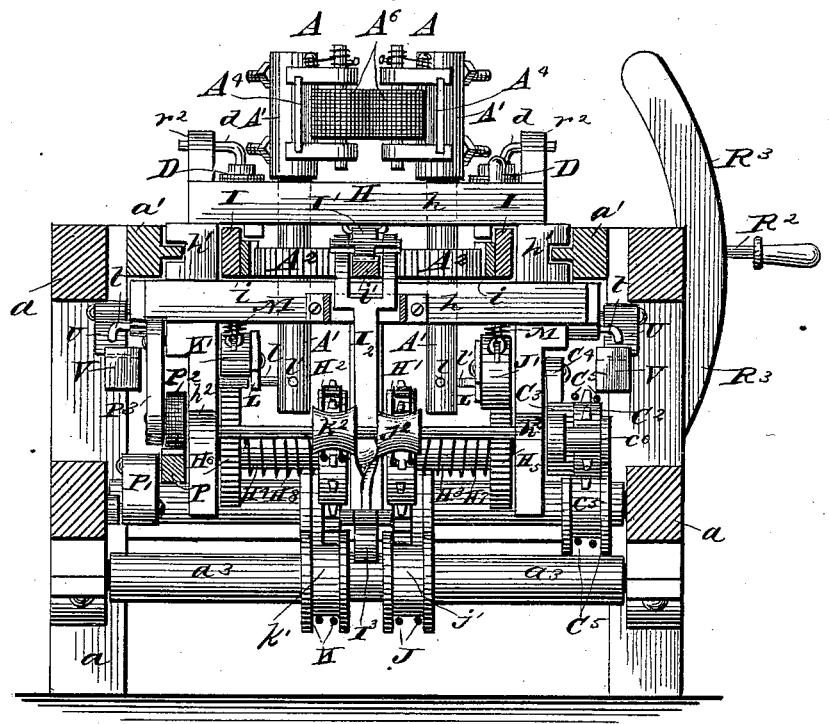
Figure 11:
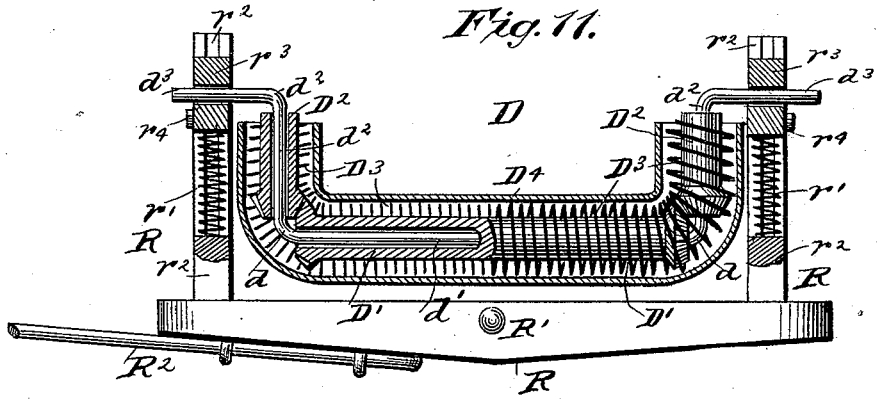
Figure 12:
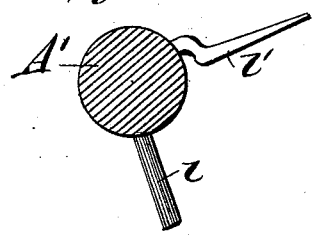

Figure 1 is a plan view of my improved gill-net puller. Fig. 2 is a bottom plan view thereof. Fig. 3 is an elevation at the port side of the machine, partly broken away. Fig. 4 is a longitudinal vertical sectional view taken on the line 1 1 in Fig. 1, and as seen from the other side of the machine. Fig. 5 is a longitudinal vertical section of the machine, taken on the line 2 2 in Fig. 1. Fig. 6 is a longitudinal vertical section taken on the line 3 3 in Fig. 1. Fig. 7 is a vertical transverse section taken on the line 4 4 in Fig. 1. Fig. 8 is a detail transverse vertical section of the pulling-grip-carriage mechanism, taken on the line 5 5 in Fig. 5. Fig. 9 is a detail sectional plan view taken on the line 6 6 in Fig. 8. Fig. 10 is a vertical transverse section of the machine, taken on the line 7 7 in Fig. 1. Fig. 11 is a transverse section taken through the outside or outboard net supporting or leading roller, and on the line 8 8 in Fig. 1. Fig. 12 is an enlarged detail cross-section of one of the shafts of the pulling-grip. Fig. 13 is a vertical transverse section taken on the line 9 9 in Fig. 1. Fig. 14 is an enlarged detail side view of one of the pawl-and-ratchet mechanisms of the pulling-grip carriage, the latter being in section on the line 10 10 in Fig. 8. Fig. 15 is an enlarged detail sectional view of one end of the gill-net reel, taken on the line 11 11 in Fig. 1. Fig. 16 is a detail sectional view of one of the pulling-grip jaws and its shaft, taken on the line 12 12 in Fig. 3. Fig. 17 is a detail sectional plan view taken through the pulling-grip carriage and on the line 13 13 in Fig. 5. Fig. 18 is a detail sectional plan view taken through the holding-grip frame and on the line 14 14 in Fig. 5. Fig. 19 is a detail vertical sectional view of one of the gripping-jaws, taken on the line 15 15 in Fig. 20; and Fig. 20 is a plan view of the jaw with its shaft in horizontal section.

The main frame $a$ of the machine is suitably constructed to support the working parts. These consist, chiefly or preferably, of a pulling-grip comprising a pair of jaws A A, fitted to a carriage adapted for reciprocation on the frame; a holding-grip comprising a pair of jaws B B, arranged at the inboard end of the machine and adapted to receive the net from the pulling-grip; a reel C at the inner end of the machine, which takes the net from the holding-grip; an outside or stern leading-roller D, over which the net is first hauled by the pulling-grip; an inner roller E, which guides the net fairly to the pulling-grip, and an adjustable cut-off F, onto which the roller E is preferably mounted, and which controls the time of closing of the pulling-grip onto the net prior to the pulling of the net by said grip.

The entire mechanism of the machine is operated by or through the medium of a single continuously-rotating driving-shaft G, which is journaled on the main frame and carries a pulley, to which a belt $g$ passes from any suitable motor. A small engine may, however, be otherwise indirectly or directly connected to the shaft for operating the machine.

I will particularly describe the principal parts of the machine, with their immediate connections and operating mechanism, in the order above named.

The pulling-grip arms A A, which will be hereinafter described in detail, are held to the upper ends of two vertical shafts A' A', which are journaled in a carriage H, which is fitted to slide upon tongued ways or bars $a'$ $a'$, held at the upper part of the main frame $a$. This pulling-grip carriage may be arranged in any suitable manner to slide lengthwise of the main frame—for instance, on rollers fitted to tracks on the frame. The carriage, as shown, is made with two upper transverse plates $h\ h$, one above the other, and connected to end blocks $h'\ h'$, which are grooved to fit loosely on the tongued ways $a'$, two lower vertical end plates or hangers $h^2\ h^2$, and a third central hanger-plate $h^3$, on which hangers the mechanism for reciprocating the carriage and causing operation of the grip-arms is supported. The grip-arm shafts $A'\ A'$ are journaled in the carriage-plates $h\ h$, and extend below them, for actuating the pawls, by which the reciprocation of the carriage by endless driving-chains is controlled, as hereinafter explained.

Between the plates and blocks $h\ h'$ of the pulling-grip carriage H a horizontal frame I is fitted to slide backward and forward independently of the main frame of the machine, and this frame I is provided at the inner faces of its opposite side bars with racks $i$, which mesh into segmental gears $A^2\ A^2$, which are fixed by set-screws, keys, or otherwise, to the vertical shafts of the grip-jaws A A, and whereby, as the frame I is moved rearward in the carriage H, the jaws will be closed on the net, and as the frame is moved forward the jaws will be opened to release the net. These reciprocating movements of the jaw-operating frame I are caused by its contact with resistance-bars, which, preferably, are the cut-off F and the jaw-operating frame of the holding-grip at the extremes of movement of the pulling-grip on the main frame, and as hereinafter more fully explained. As the jaws A A are closed on the net by the movement of the frame I, the jaws are locked closed by a pawl I', which is hung to the top of the carriage H and drops by gravity into a rack $i'$ on a bar which forms part of the frame I and ranges lengthwise of it between the grip-jaw-operating gears $A^2\ A^2$. The pawl is tripped from the rack by means of a vertically-ranging rod or bar $I^2$, which is held in suitable guides on the carriage, and is adapted to be lifted by an angle-lever $I^3$, which is fulcrumed to the lower front corner of the carriage, and at proper time at the extreme forward movement of the carriage strikes a suitable trip bar or stop $i^3$, which is held at the end of the frame next the holding-grip, and preferably to one of the shafts which support the sprocket-wheels over which pass the endless chains, which reciprocate the pulling-grip. This disengagement of the pawl I' from the rack $i'$ takes place immediately after the holding-grip jaws are closed upon the net, which—as the pulling-grip moved forward, hauling the net with it—had been up to this time carried inward by the reel C at the back end of the machine, as hereinafter more fully explained. The instant the pawl I' is disengaged from the frame-rack $i'$, which unlocks the pulling-grip jaws, said jaws are immediately opened to release the net to the holding-grip by means of a couple of springs $I^4$, which are fastened at opposite ends to the carriage H and frame I, and force the frame backward through or in the carriage, and thereby cause the racks $i'$ to give partial rotations to the grip-gears $A^2$, the shafts $A'$, and, consequently, to the grip-jaws A to open them, as will readily be understood.

The reciprocation of the pulling-grip is automatically effected from the continuously-rotating driving-shaft G by means of two endless chains J K, the former moving the pulling-grip forward or toward the holding-grip and reel, and the latter moving the pulling-grip backward or toward the cut-off and net-guide rollers. These chains J K run over pairs of chain-wheels $j\ j\ k\ k$, which are preferably placed loosely on two transverse shafts $a^2\ a^2$, one of which is held at each end of the main frame $a$, in lower timbers thereof. The lower side of the chain J runs under a sprocket-wheel $G'$, which is fixed to the driving-shaft G, and the lower side of the chain K runs over a sprocket-wheel $G^2$, which is also fixed to the driving-shaft. The upper sides of the chains J K run, respectively, over the tops of two sprocket-wheels $H'\ H^2$, which are fixed, respectively, to independent shafts $H^3\ H^4$, which are journaled transversely and about in alignment in the pendent hangers $h^2\ h^2\ h^3$ of the pulling-grip carriage H; hence it follows that the upper sides of both belts J K are entirely clear to reciprocate the pulling-grip on the main frame, and that the upper sides of the two belts run in reverse directions, so that the grip may be pulled forward by the chain J and may be pulled backward by the chain K when the carriage is clutched alternately to said chains by mechanism and in the manner presently explained. A pair of idler-pulleys or sprocket-wheels $j'\ k'$ on a shaft $a^3$, held to the frame $a$, hold the lower sides of the chain belts J K above and below their respective driving-wheels $G'\ G^2$, and two pairs of idler-pulleys or sprocket-wheels $j^2\ k^2$, journaled on the lower part of the carriage H, hold the upper sides of the chain belts J K down upon the sprocket-wheels $H'\ H^2$, respectively, of the carriage. Ratchet-wheels $H^5\ H^6$ are loosely mounted on the shafts $H^3\ H^4$, respectively, at the inner faces of the end hangers $h^2\ h^2$ of the carriage H, and at their inner faces the ratchets are provided, respectively, with inwardly-projecting pins $h^5\ h^6$, to which are connected one end of spiral springs $H^7\ H^8$, which encircle the shafts $H^3\ H^4$, respectively, and are fastened at their other ends to the sprocket-wheels $H'\ H^2$, or to pins fixed thereto. These springs $H^7\ H^8$ act normally to turn the loose ratchet-wheels on their shafts in reverse directions and until their pins $h^5\ h^6$ stop against pins $h^4\ h^4$, which are fixed radially one in each shaft next the ratchet-wheels. This gearing allows either sprocket-wheel $H'$ or $H^2$, with its shaft, to make nearly a full revolution before the shaft-pins $h^4$ strike the ratchet-wheel pins $h^5$ or $h^6$, thus giving the pawls J' K', which are pivoted to the pulling-grip carriage H above the ratchet-wheels, ample time to be disengaged from one of the ratchet-wheels and engaged with the other ratchet-wheel without interfering with the continuous travel of the driving-chains J K by or from the main shaft G of the machine.

The arrangement of the pawls J' K' relatively to the ratchet-wheels $H^5$ $H^6$ and the mode of operation of the pawls by or through the medium of the pulling-grip-jaw shafts is as follows: These two pawls are made alike, but are set reversely or with their engaging ends presented one toward the rear or inboard end of the machine and the other toward its outboard end; hence a detailed description of the pawl J' in connection with the ratchet-wheel $H^5$ and adjacent parts, and with more special reference to Figs. 14 and 6 of the drawings will suffice for a clear understanding of the general construction and arrangement of both the pawls. The pawl J' is fulcrumed on a lateral pin or bolt $j^3$ to the inner face of one hanger $h^2$ of the pulling-grip carriage H, and its acting end is adapted to engage the ratchet-wheel $H^5$ on the carriage-shaft $H^3$. At its center the pawl is provided with a pendent trip stud or lug L, which is adapted to be acted upon by either one of two pins or studs $l$ $l'$, which project radially and horizontally and about at right angles to each other from the shaft A' of the pulling-grip jaw at that side of the machine. At its upper or back part the pawl is provided with a fixed central lengthwise-ranging wire or rod $m$, preferably in the form of an elongated staple, and which is engaged loosely by an eye $m'$, which is at the lower end of a wire or rod $m^2$, which extends upward into a hole in the lower cross-bar $h$ of the pulling-grip carriage H, or preferably into a hole in a metal plate or washer $m^3$, set into the cross-bar. A spring, preferably a spiral spring M, arranged on the rod $m^2$ between the washer and the eye of the rod, normally presses the rod downward, and as the eye $m'$ is free to slip on the staple $m$ either way past the center or fulcrum $j^3$ of the pawl, the spring M will act as the pawl is thrown by the grip-jaw-shaft pins $l l'$ to cause a positive movement of the pawl both ways; or, in other words, as the pawl-trip stud L is thrown by the grip-shaft pin $l$ to carry its acting end downward into engagement with the ratchet-wheel $H^5$ the instant the pawl is overbalanced that way, the slip of the spring-pressed rod on the pawl-staple will positively complete the movement of the pawl and engage it with the ratchet-wheel, and, on the other hand, as the pawl-trip stud L is acted upon by the other grip-shaft pin $l'$ to disengage the pawl from the ratchet-wheel, and as the disengaged pawl overbalances the other way, the spring-pressed rod of the pawl will slip in the other direction on the pawl-staple and positively throw the pawl over to a stop pin or stud $m^4$ on the pulling-grip carriage, and thus hold the pawl securely, so it cannot be accidentally engaged at improper time with the ratchet-wheel.

Both pawls J' K' are provided with the same spring-actuated overbalancing devices to cause prompt and secure engagement of them with their respective ratchet-wheels, and to prevent accidental engagement of them; hence these pawl overbalancing devices are important in assuring positive operation of the pawls and preventing breakage of the pulling-grip carriage or its mechanism, however short or long the strokes of the reciprocating pulling-grip may be. The grip-shaft trip-pins $l$ $l'$ may be made somewhat elastic, especially the pins $l'$, which disengage the pawls from their ratchet-wheels. One of the pawls J' K' is engaged with its ratchet-wheel just before the other pawl lets go of its ratchet, and the loose arrangement of the chain-wheel shafts in the ratchets, in connection with the stop-pins and springs, allowing a whole or partial turn of the shafts after either pawl is positively engaged with its ratchet, gives ample time for the disengagement of the other pawl before the last-engaged pawl and ratchet are locked by contact of the pins $h^4 h^5$ to then carry the pulling-grip with the chain on the wheel H' or $H^2$ next the engaged pawl, and as will be hereinafter more fully explained.

The holding-grip jaws B B are held to the upper ends of a pair of vertical shafts B' B', which are journaled in a transverse frame N, which comprises a pair of upper and lower cross-bars $n$ $n$, fixed to end blocks $n'$ $n'$, which, as shown, are fitted loosely onto the tongues of the main-frame slideways $a'$ $a'$, this frame N being held against rearward movement on the main frame by pins $n^2 n^2$, fixed in the latter. It will be understood, however, that the frame N may be fixed in any suitable manner to the main frame. Within the frame N another frame O is fitted to slide lengthwise of the machine, and a central bar $o$ of the frame O is provided at opposite side faces with racks $o'$ $o'$, which engage segmental gears $B^2$ $B^2$, fixed to the shafts B' B' of the holding-grip jaws B B, and whereby, as the frame O is forced backward in the frame N by contact of the pulling-grip frame I with it, the rack-bar $o$ $o'$ will close the jaws B B onto the net, which up to this time, and while the pulling-grip was hauling it forward between the open jaws B B, had been carried rearward by and over the reel C, in a manner presently explained. After the jaws B B are closed upon the net they are locked by means of a pawl N', which is hung to the frame N and engages a rack-bar $N^2$, which is fixed to the frame N, and preferably directly under the rack-bar $o$ $o'$ of the sliding frame O. When this pawl is disengaged from the rack by devices presently described, the frame O is forced rearward or toward the pulling-grip by a couple of springs O' O', which act between the frame N and lugs on the frame O, and as the latter moves backward its rack-bar, by action on the grip-jaw gears $B^2$, will open said jaws about at the time the pulling-grip commences its next forward stroke, hauling the net with it.

This relatively-timed disengagement of the pawl to allow opening of the holding-grip jaws as the pulling-grip starts forward with the net is effected by mechanism arranged as follows: To the under side of the holding-grip frame N is journaled the central portion of a short transverse shaft $p$, which has two angularly-bent end arms, one of which underlies the pawl $N'$, and the other is connected to one end of a link or bar $p'$, the other end of which is pivoted to a wheel or plate $p^2$, which is free to revolve on the inboard shaft $a^2$ of the frame $a$. To this wheel $p^2$ is also pivoted the inner end of a link or bar $p^3$, the other end of which is pivoted by a pin or stud $p^4$ to the inner end of a longitudinally-ranging bar P, which is preferably serrated or toothed at its upper face or edge, and is supported by a couple of cam-like rock-arms $P'$ $P'$, which are pivoted at one end to the bar P and at the other end to one of the side bars of the main frame $a$. With this construction it is obvious that any force or device which will move the bar P endwise toward the pulling-grip will at the same time raise this bar and lower the pawl $N'$ to the rack $N^2$, to lock or allow the pawl to lock the holding-grip frame O in position to hold the grip-jaws B B closed on the net, and any device which will move the bar P toward the holding-grip and reel will lower the bar and disengage the pawl $N'$ from the rack $N^2$ to allow the holding-grip jaws to open for releasing the net to the reel. The bar P is moved outward at proper time by means of a pendent bar or rod $O^2$, which is fixed to the frame O and acts during the latter part of the outward movement of this frame upon the laterally-projecting pivot $p^4$, or it may be upon another pin suitably placed on the link $p^3$ or on the bar P, and this bar is moved forward by a roller $P^2$, which is preferably made of rubber or is covered with rubber, and is journaled at the lower end of a pawl-bar $P^3$, which is hung to the pulling-grip carriage H and may swing forward toward the holding-grip and reel, but not backward, as a stop-pin $p^5$ or a suitable shoulder on the carriage H prevents it. I prefer to place the journal or axle of the roller $P^2$ in a vertical slot in the bar $P^3$, and to place a spring $p^6$ in the slot above the journal, whereby the roller will have independent vertical play, so that the bar $O^2$ on the holding-grip frame may the more certainly lift the bar P to its highest position, at which time the rock-arms $P'$ stop against pins $p^7$ in the main frame to prevent the bar P being carried backward too far by the action of the bar $O^2$ on its pin-connection $p^4$, as above described. The spring $p^6$ holds the roller to the raised bar P with sufficient force to throw the bar inward toward the holding-grip to disengage the pawl $N'$ from the rack $N^2$ immediately the pulling-grip starts inward and forward with the net. Should the roller $P^2$ be sufficiently elastic to allow full rising and outward movement of the bar P as the bar $O^2$ acts on the pin $p^4$, the roller-spring $p^6$ may be dispensed with and the roller may simply be journaled in the arm $P^3$ to allow it to roll over the raised bar P as the pulling-grip moves forward and inward with the net.

Before particularly describing the reel C, I will explain in detail the construction of the pulling and holding grip heads and jaws, as follows: Both the pulling and holding grip heads and jaws may be made alike; but the construction of the pulling-grip jaws is probably most important, as the pulling-grip is subjected to a much heavier strain than the holding-grip. Hence I will first describe one of the pulling-grip jaws with more particular reference to Figs. 16, 19, and 20 of the drawings. The grip-head consists of upper and lower arms or plates $A^3$ $A^3$, which have reduced back portions or stems $a^4$ $a^4$, which are preferably round and are fitted in metal sleeves $a^5$ $a^5$, which are placed in holes made through the enlarged upper end or head of the grip-shaft $A'$. The arm-stems $a^4$ are screw-threaded to receive stop or jam nuts $a^6$ $a^6$, and to the arms is fitted a resistance-plate $A^4$, which is normally held outward to shoulders on the arms by a spring, preferably a spiral spring $A^5$, placed between the plate and the shaft, and preferably set into a recess in the shaft. The plate $A^4$ is held in place by forking its ends around or at the side edges of the arms. Between the outer ends of the grip-arms $A^3$ $A^3$ is journaled by its vertical shaft $a^7$ the roller $A^6$, which grips the net and is preferably covered by a rubber facing $a^8$, which may be plain, toothed, or corrugated, as preferred. The grip-roller is set eccentrically on its shaft $a^7$, and is normally held with its shortest radius at one side, where it will first close on the net, by means of a spring $a^9$, connected by a pin or otherwise to one of the arms $A^3$, and to a pin $a^{10}$ in the shaft $a^7$, and this pin is thrown by the spring against another pin $a^{11}$ on the arm $A^3$, which stops the grip-roller when its smaller radius is presented properly to the net, and thus allows the rollers of both grip-arms to turn only in one direction to make their eccentricity available in securing a gradually-tightening hold on the net as the latter offers resistance to the pull of the pair of grip-jaws, which have been closed upon it in the manner above explained. Should the gripping-rollers meet an unusual resistance in closing upon or hauling the net, the entire arms and rollers $A^3$ $A^6$ of the grip will be moved or forced endwise in the grip-shafts $A'$ against the tension or resistance of the springs $A^5$, to prevent overstrain or breakage of the grip, but without losing its hold on the net.

As hereinbefore stated, the holding-grip arms may be arranged precisely like those of the pulling-grip. I have shown the holding-grip with arms $B^3$ $B^3$ on each shaft $B'$, and supporting eccentrically-arranged grip-rollers $B^6$, thrown by springs $b^9$, to stop with their shortest radius next the net when first gripping it, and operating substantially like the parts $A^3$ $A^6$ $a^9$, above described; but I have not shown springs behind the grip-rollers $B^6$ like the springs or springs and plates $A^5$ $A^4$ of the pulling-grip, but have shown the stems $b^5$ of the holding-grip roller-arms fitted snugly to their shafts $B'$ and retained by nuts $b^4$, which construction will probably answer for the holding-grip, which does not undergo very severe strains. It will be noticed that the jaws of the pulling-grip close onto the net at a forwardly-converging angle, thus facilitating their gradual tightening upon and secure hold of the net as the grip moves forward with it.

The net-receiving reel C is held to a shaft $C'$, journaled at the inboard end of the machine, and consists of opposite ends or heads $c$ $c$, which are provided with slots $c'$, into which the opposite ends of the reel-bars $c^2$ are loosely fitted. Springs $c^3$, placed in these slots, normally force the bars to one end of them, but allow the bars to yield under the draft or pull on the reel to allow the net with its floats and sinkers to draw over the reel without tearing the net. The reel is turned to draw the net rearward or inward by its cross-bars after the net has been released from the holding-grip, and at precisely the speed of forward travel of the pulling-grip, by mechanism actuated at and from the pulling-grip carriage, and consisting of a sprocket-wheel $C^2$, which is journaled to one side of the carriage and has a ratchet $C^3$, which is adapted to be engaged by a pawl $C^4$, hung above it on the carriage. An endless chain $C^5$ runs over this wheel $C^2$ and around a sprocket-wheel $c^4$, fixed to the reel-shaft, and an idler or loose wheel $c^5$ on the outer shaft $a^2$ of the main frame. The pawl $C^4$ may be engaged with the ratchet $C^3$ of the wheel $C^2$ by gravity alone or by any suitable spring. Idler pulleys or wheels $c^6$ $c^6$ on the pulling-grip carriage hold the chain $C^5$ onto the wheel $C^2$. It is obvious that as the pulling-grip starts inward or forward with the net the pawl $C^4$, by engaging the ratchet of the sprocket-wheel $C^2$, will lock it, and consequently lock the chain to it to cause the now stationary wheel $C^2$ to haul the chain $C^5$ with it for precisely the distance the pulling-grip moves forward, and the chain will impart a like degree of movement to the reel to cause it to take up the slackness of the net as fast and no faster than the pulling-grip hauls it in, and thus keep the net drawn quite taut between the pulling-grip and reel and without overstraining the net, and also giving the holding-grip straight twine to properly close upon just prior to the release of the net from the pulling-grip. As the pulling-grip recedes after dropping or releasing the net, the sprocket ratchet-wheel $C^2$ will freely rotate in the opposite direction to that taken on the hauling stroke of the grip, and the pawl will then slip over the teeth of the backwardly-moving ratchet $C^3$ of the rotating wheel $C^2$, which then has no pulling effect on the reel-driving chain; hence the reel will be turned to draw the net in over it only as fast as the pulling-grip hauls the net from the water and over the leading and guide rollers D E, which will now be particularly described.

The construction of the outside or net-leading roller D will probably be best understood from Fig. 11 of the drawings, which shows that the roller proper in its preferred form is made with a central shaft $d$, bent four times at right angles—twice near each end—to form a central horizontal portion $d'$, two vertical or about vertical end portions $d^2$ $d^2$, extending upward at the ends of the part $d'$, and two extreme horizontal end portions $d^3$ $d^3$, which are supported in vertically-movable boxes $r^3$ $r^3$, fitted to slide in end posts $r^2$ $r^2$ of a frame R, which supports the entire roller D, and is pivoted by a pin or bolt $R'$ preferably to the outer end of the machine-frame $a$, said pivot allowing the entire roller-frame and roller to tilt or oscillate on it laterally of the machine. Springs $r'$ $r'$, placed in the slots in which the roller-boxes move and under these boxes, allow them to yield downward under the strain of the net on the roller as the net is being hauled from the water over the roller, and index pointers or fingers $r^4$ on the boxes move along graduated scales $r^5$ on the frame-posts $r^2$, and thus indicate or register the pulling strain of the net on the roller to enable the attendant to ease up on the draft, should it be necessary at any time to prevent overstrain or breakage of the net.

To the roller-frame R, and preferably to its bottom cross-bar, is fixed a suitable lever or arm $R^2$, which is made somewhat elastic at its outer part, where it is provided with a lug $r^6$, adapted to enter any one of a series of notches $r^7$, made in a curved latch-bar $R^3$, fixed to the machine-frame and set vertically, so that the lever may lock into it to hold the net-leading roller D inclined or sloping downward laterally either to "starboard" or "port," as the direction or lead of the net being hauled in may require. This oscillatory feature of the roller is important, as it allows the roller to be set to any required incline either way to accommodate the constantly-changing "lead" of the net from "dead ahead" to "dead astern" and all intermediate points, thus assuring a constant even lead of the net to the guide-roller E, which passes the net to the pulling-grip. I preferably place a tube or sleeve $r$ on the pivot $R'$ of the leading-roller or its frame to give ample clearance of the roller outside of or behind the main frame of the machine or its support. It is obvious that the net-leading roller may be hung to a support other than the machine-frame to operate in conjunction with the guide-roller E and the pulling-grip. For instance, it may be hung on a separate frame or on the gunwale of the boat and still operate efficiently by reason of its oscillating quality or function. When the guide-roller is mounted at the side or forward quarter of a steam fishing-boat, the oscillation of the roller would be "forward and aft" instead of to starboard or port, as when hung at the stern of a sailing-vessel.

The peculiar construction of the roller D, aside from its oscillation, is also important, as it is designed to prevent excessive wear of the net whatever relative positions the roller and net may assume.

Referring again more particularly to Fig. 11 of the drawings, it will be seen that on the parts $d'$ $d^2$ $d^2$ of the roller-shaft are placed loose tubes or sleeves $D'$ $D^2$ $D^2$, respectively, which are geared together, preferably, by bevel gear-wheels at the lower end bends of the shaft, and around these sleeves is placed loosely a wire incasement, which may be a series of rings, but is preferably a continuous coil $D^3$ of wire encircling the sleeves and capable of independent rotation thereon.

Outside of or around the wire coil or sleeve incasement $D^3$ is placed an exterior covering $D^4$ of canvas, rubber, or other fabric or material, and over which the net will be hauled by the pulling-grip. This covering $D^4$ is free to rotate on the wire coil or rings $D^3$, or with them, and makes an efficient guard, which keeps the net out of the sleeve-incasement $D^3$, or the joints of the horizontal with the vertical sleeves, and assures a smooth easy passage of the net over the leading-roller.

I am not limited to the use of an incasement $D^3$ made of metal wire, which is preferred, as any other suitable material may be employed for the incasement. Where a leading-roller of this character, mounted to oscillate, as above described, is employed, the side sleeves $D^2$ may be dispensed with, leaving the shaft, the sleeve, the wire coil or incasement, and the loose exterior covering to form a straight net-leading roller within the scope of this part of my invention; but the upward end extensions of the sleeves and their wire coil and the exterior covering are preferred with the oscillating roller and quite necessary with a non-oscillating roller to lead the net more safely to the pulling-grip. Should the roller-shaft be large enough in diameter, the wire coil or ring incasement $D^3$ may be placed directly upon it, and the sleeves and their gears be dispensed with, or the rotating sleeves, geared together or not, may be used on the central shaft of the roller and be overlaid directly by the covering, and the wire incasement be then dispensed with, all within the scope of my invention. It will also be understood that I may place the wire incasement $D^3$ only at the angles or geared ends of the roller-sleeves instead of covering the entire sleeves by the incasement, as the principal purpose of the incasement is to prevent entanglement of the net with or at the geared ends of the sleeves.

The special construction of the roller, as shown in the drawings, is most desirable when it is mounted for lateral oscillation or adjustment, as it fully protects the net, however the roller may be held or set to lead the net to the pulling-grip.

The roller E, which guides the net from the leading-roller, is shown supported on the frame of the cut-off F, which is the preferred arrangement when the cut-off is used; but the guide-roller may be otherwise supported intermediately of the leading-roller and pulling-grip. This guide-roller E in its preferred form is made U-shaped, like the preferred form of the leading-roller D, and has an inside shaft $e$, which is shown secured by its bent ends to standards $s$ $s$ of the frame of the cut-off F. On this bent shaft $e$ are placed sleeves $e'$, preferably geared together, and these sleeves are encircled or incased—at their meeting angles more especially—by a wire coil or ring $e^2$, which in turn is cased by an exterior covering $e^3$, over which the net passes to the pulling-grip. The construction of the guide-roller is thus in all respects similar to that of the leading-roller and it protects the net in like manner, and as will be understood without further detailed description. The guide-roller is considerably narrower, but is preferably somewhat higher at its ends, than the leading-roller, to cause the guide-roller to gather the net sidewise or laterally as it passes over it to the pulling-grip. (See Fig. 13 of the drawings.)

The frame S of the cut-off F is fitted to slide lengthwise of the machine on the side ways $a'$ $a'$ of the main frame $a$, and to its lower side is journaled a transverse shaft T, the opposite ends $t$ $t$ of which are bent rearward underneath a pair of pawls U U, which are pivoted one at each end of the cut-off frame S, and are adapted to engage rack-bars V V, which are fixed to opposite sides of the main frame and extend lengthwise of the machine for a few feet, more or less. To whatever position the cut-off is shifted by hand toward the pulling-grip the pawls U will hold it by engaging the racks V, and when the cut-off is so held the sliding frame I of the pulling-grip will, by contact with it on the backward stroke of this grip, be forced through the grip-carriage H to close the grip-jaws A A onto the net.

Provision is made for quick and easy shifting of the cut-off along the frame $a$, to determine the point at which the grip-frame shall strike it for closing the grip-jaws on the net, by means of a post $s'$ on the cut-off frame, to be grasped by the attendant, and a lever W for disengaging the pawls U from the racks V. This lever W is connected by a link $w$ with a crank $t'$, formed in the pawl-disengaging shaft T; hence it is only necessary, to operate the lever, to turn the shaft T and lift the two pawls U U simultaneously from the racks V V after the pulling-grip has started on its effective forward stroke with the net, and before the pulling-grip reaches the cut-off on its return or back stroke ample time is afforded the operator, standing by the post $s'$, to slide the cut-off to such position on the frame $a$ as shall cause it, when locked to the racks V by engagement therewith of the pawls U, to act on the pulling-grip frame I, or, rather, to cause said frame to strike it at proper time to cause the gripping-jaws A A to close onto the net at a place where it is free from floats, sinkers, or other tackle, or where fish are not entangled in it. Hence this operation of the cut-off prevents crushing of the fish by the pulling-grip jaws, and also prevents tearing of the net by the jaws and assures a most secure grasp of the net by the jaws.

To facilitate a clearer understanding of the preferred construction of the gill-net puller shown in the drawings and above described, I will explain the continuous operation of all the main parts during one complete forward hauling stroke of the pulling-grip and its return to the outer end of the machine, as follows: We will suppose that the pulling-grip had just been carried outward or backward by the driving-chain K, while said grip-jaws A A are open and the holding-grip jaws B B are closed upon the net, and that the pulling-grip frame I, by contact with the cut-off F or its frame S, had just been forced toward the holding-grip and reel to close the jaws A A upon the net, and the pawl I' then locks or holds the jaws to the net. As the pulling-grip jaws were closing, the trip-pins $l\ l'$ in the jaw-shafts A' A' acted on the pulling-grip-carriage pawls to engage the one J' with the ratchet-wheel $H^5$, and a little later to disengage the pawl K' from the ratchet-wheel $H^6$, the engaging-pawl having a slight lead on the disengaging-pawl, and while both pawls were engaged the sprocket-wheel H' and its shaft $H^3$, now being turned by the chain J, would make nearly a full revolution before the pin $h^4$ of said shaft would strike the pin $h^5$ of the ratchet-wheel $H^5$ after the pawl J' had engaged said wheel, and the instant the pawl K' was disengaged from the ratchet-wheel $H^6$ the latter, with its shaft $H^4$, was thrown around backward by the spring $H^8$ until its pin $h^6$ had struck the pin $h^4$ in the shaft $H^4$, thus leaving the ratchet-wheel $H^6$, the sprocket-wheel $H^2$, and its shaft $H^4$ and spring $H^8$ free to rotate together under the draft of the chain K without effect on the pulling-grip. The instant the pins $h^5\ h^4$ of the ratchet-wheel $H^5$ and shaft $H^3$ had come in contact after the pawl J' had engaged this ratchet-wheel the carriage H was locked to the running chain J and had instantly started forward with the pulling-grip, the jaws of which had already been closed upon the net by the operation of the sliding frame I, as above described. Immediately the pulling-grip starts forward under the draft of the chain J for hauling the net in over the leading and guide rollers D E, the pawl-bar and roller $P^2\ P^3$ acts on the bar P, and thereby disengages the pawl N' from the rack-bar $N^2$ of the inwardly-thrust frame O of the holding-grip, (which had recently been closed on the net while the pulling-grip was moving outward or on its last return or ineffective stroke,) and thus permits the springs O' to force or slide the frame O backward toward the pulling-grip, and thereby open the holding-grip jaws B B to release the net to the reel, and during the latter part of the backward motion of the frame O its bar $O^2$ acts on the pin or resistance-lug $p^4$ next the bar P to raise the latter and throw it endwise toward the pulling-grip, and as the latter moves forward its roller $P^2$ travels on the bar P without depressing it much, as the resistance of the springs O' on the frame O and bar $O^2$ prevents this. After the frame O moves outward and opens the holding-grip, thereby releasing the net thereat, this frame will be thrust forward again a little later by the pulling-grip frame I to close the holding-grip on the net, as presently explained. As soon as the holding-grip was opened or allowed to open by tripping its pawl-detent N' from the starting pulling-grip carriage, as above stated, and as the pulling-grip moves forward with the net, the sprocket-wheel $C^2$ and chain $C^5$ will be locked to the pulling-grip carriage H by the pawl $C^4$ engaging the sprocket-wheel ratchet $C^3$; hence the chain $C^5$ will turn the reel C to haul the net in over it as fast, and only so fast, as the pulling-grip hauls the net in over the rollers D E from the water. As the forwardly-moving pulling-grip approaches the end of this stroke, its frame I, still locked by the pawl I' to hold the jaws A A closed onto the net, strikes the holding-grip frame O and forces it forward or inward, thereby closing the holding-grip jaws B B onto the net quite close to the pulling-grip jaws, and the pawl N' then automatically engages the rack $N^2$ to lock the jaws B B closed onto the net. Immediately this occurs the trip-lever $I^3$ on the pulling-grip carriage H strikes the stop $i^3$ on the shaft $a^2$, and thereby lifts the pawl I' from the rack $i'$ of the frame I, and the springs $I^4$ instantly force or slide this frame outward, and thereby cause opening of the pulling-grip jaws A A to release the net to the holding-grip, which retains it during the outward or rearward ineffective stroke of the pulling-grip, thus preventing a backward drag or haul of the net by its contact with the receding pulling-grip frame or carriage. It will be seen that the reel C is a conveyer or one of a system of conveyers over which the net is hauled or drawn inboard, where the fish will be taken from it. Immediately the pulling-grip frame I moved outward to cause opening of the jaws A A, said jaw-shafts in turning had by their radial pins $l\ l'$ caused an engagement of the pawl K' on the carriage H with the carriage ratchet-wheel $H^6$, and a little later had caused the disengagement of the pawl J' from the carriage ratchet-wheel H⁵, and the sprocket-wheel H² with its shaft H⁴ had been turned nearly one revolution until the pin h⁴ in said shaft struck the pin h⁵ on the wheel H⁶, and during this turn of the parts H² H⁴ the pawl J' had ample time to be disengaged from the other sprocket-wheel H', and immediately this occurs the spring H⁷ will at once throw the ratchet-wheel H⁵ around backward until its pin h⁵ strikes the pin h⁴ in the shaft H³, which allows the wheel H⁵, its shaft H³, and the spring H⁸ to be turned forward by the continuously-running chain J in the same direction as before, but without effect on the pulling-grip, which is now, by means of the pawl K', the ratchet-wheel H⁶, and the sprocket-wheel H², engaged with the chain K to be carried backward thereby toward the leading and guide rollers D E and the cut-off F. During this backward stroke of the pulling-grip the ratchet C³ will slip under the pawl C⁴ on the carriage H, and consequently the sprocket-wheel C² will rotate freely and slip along under the upper side of the reel-belt C⁵ and will not haul the belt with it; hence the reel will remain at rest during the entire backward stroke of the pulling-grip and while the holding-grip is closed on the net. As the pulling-grip approaches the cut-off F, the latter will be adjusted by the operator grasping the lever W for setting the pawls U U at proper places along the frame-racks V V, and so as to assure the closing of the pulling-grip jaws A A onto the net at a place where it is free from fish, floats, or sinkers. As the now rearwardly-projecting frame I of the rearwardly-moving pulling-grip strikes the cut-off or its frame S, said frame will be forced forward or toward the holding-grip, when it will be again locked in forward position by the pawl I'. During this forward movement of the frame I it had turned the grip-jaw shafts A' A' and through their pins l l' engaged the pawl J' with the ratchet-wheel H⁵ to cause it to be hooked or clutched to the running chain J, and a moment later disengaging the pawl K' from the ratchet-wheel H⁶ and releasing the pulling-grip carriage from the running chain K. All is now ready for the next forward or effective net-hauling stroke of the pulling-grip by the chain J, in the manner above described.

The importance of the loose ratchet-wheels H⁵ H⁶ and their spring-connections H⁷ H⁸ with the sprocket-wheels H' H², together with the stops limiting the rotation of the sprocket and ratchet wheels to allow time for disengagement of one of the pawls J' K' after the other is engaged, and also the importance of the springs M acting on the pawls to positively and promptly throw them to either extreme of adjustment, and also the gradually-tightening hold of the grip-jaws on the net and the yielding construction of the reel-bars; and also the construction and operation of the net-leading and guide rollers D E and the arrangement of the roller-lever R², allowing a man to oscillate or hold or lock said roller D level or inclined to either starboard or port, as the lead of the net requires, are all hereinbefore sufficiently explained.

It is manifest that I am not limited to using all parts of the net-puller shown and described, as I may use the pulling-grip alone or said grip in connection with the reel operated from it, and I may use the cut-off or not, and should it be dispensed with the pulling-grip frame may be operated to close this grip onto the net by any suitably-placed resistance-bar on the main frame. I may also use the pulling-grip and reel without the holding-grip, as the reel may prevent backward draft of the net by the receding pulling-grip frame. It will be understood, however, that I prefer to use all features or elements of the machine herein shown and described in a completely-organized co-operative mechanism actuated mainly from a single driving-shaft.

Having thus described my invention, what I claim as new, and desire to secure by Letters Patent, is—

1. In a gill-net puller, the combination of a frame, a reciprocating net-pulling grip thereon, chain-and-wheel mechanism on the frame and pulling-grip carriage for operating the grip, and driving mechanism for the chain-and-wheel mechanism, substantially as herein set forth.

2. In a gill-net puller, the combination of a frame, a reciprocating net-pulling grip thereon, chain-and-wheel mechanism on the frame and pulling-grip carriage for operating the grip, driving-gearing for the chain-and-wheel mechanism, an adjustable cut-off on the frame controlling the time of closing of the pulling-grip onto the net, and mechanism for actuating the same, substantially as herein set forth.

3. In a gill-net puller, the combination of a frame, a reciprocating pulling-grip thereon, chain-and-wheel mechanism on the frame and pulling-grip carriage for operating the grip, driving-gearing for the chain-and-wheel mechanism, and a roller guiding the net to the grip, substantially as herein set forth.

4. In a gill-net puller, the combination of a frame, a reciprocating pulling-grip thereon, chain-and-wheel mechanism on the frame and pulling-grip carriage for operating the grip, driving-gearing for the chain-and-wheel mechanism, a net-conveying reel, a driving-chain geared therewith, and pawl-and-ratchet mechanism on the pulling-grip carriage operating the net-reel chain to carry the net inward only on the effective stroke of the pulling-grip, substantially as herein set forth.

5. In a gill-net puller, the combination of a frame, a reciprocating net-pulling grip thereon, chain-and-wheel mechanism on the frame and pulling-grip carriage for operating this grip, driving-gearing for the chain-and-wheel mechanism, and a holding-grip on the frame operated by the advancing pulling-grip to close the holding-grip onto the net prior to release of the net by or from the pulling-grip, substantially as herein set forth.

6. In a gill-net puller, the combination of a frame, a reciprocating net-pulling grip thereon, chain-and-wheel mechanism on the frame and pulling-grip carriage for operating the grip, driving-gearing for the chain-and-wheel mechanism, a roller arranged outside of the grip to oscillate laterally to control the lead of the net inboard to the pulling-grip, and mechanism for actuating the same, substantially as herein set forth.

7. In a gill-net puller, the combination of a frame, a reciprocating net-pulling grip thereon, chain-and-wheel mechanism on the frame and pulling-grip carriage for operating this grip, driving-gearing for the chain-and-wheel mechanism, a roller arranged outside the pulling-grip and guiding the net thereto, a roller arranged outside of the guide-roller and held to oscillate laterally to control the inward lead of the net to the guide-roller and pulling-grip, and mechanism for actuating the same, substantially as herein set forth.

8. In a gill-net puller, the combination, with a frame, of a carriage reciprocating thereon, net-gripping devices on the carriage, a pair of driving-chains on the main frame operated in reverse directions, gearing actuating said chains, two shafts journaled transversely for independent rotation on the carriage, sprocket-wheels on said shafts engaged by the reversely-running driving-chains, a ratchet-wheel loose on each of the carriage-shafts, a spring connecting each of the sprocket-wheels or its shaft with the ratchet-wheel loose on said shaft, stops on the shafts and ratchet-wheels limiting the turning of the wheels on the shafts by the springs, and pawls fulcrumed to the carriage and adapted to the ratchet-wheels, substantially as herein set forth.

9. In a gill-net puller, the combination, with a main frame, of a carriage reciprocating thereon, a frame fitted to slide lengthwise in the carriage, net-gripping devices on the carriage geared with the sliding frame to be opened and closed thereby, a pair of reversely-running driving-chains on the main frame, gearing actuating said chains, two shafts journaled for independent rotation on the carriage, sprocket-wheels on said shafts engaged by the driving-chains, a ratchet-wheel loose on each of the carriage-shafts, a spring connecting each of the sprocket-wheels or its shaft with the ratchet-wheel loose on said shaft, stops on the shafts and ratchet-wheels limiting the turning of the wheels by the springs, pawls fulcrumed to the carriage and adapted to the loose ratchet-wheels, and trip-pins on the net-gripping devices engaging and disengaging the pawls and ratchet-wheels as the sliding frame is moved in opposite directions through or in the carriage to close and open the net-gripping devices, substantially as herein set forth.

10. In a gill-net puller, the combination, with a main frame $a$, of a reciprocating carriage H, fitted thereon and provided with independently-rotating shafts $H^3$ $H^4$, provided, respectively, with fixed driving-wheels $H'$ $H^2$, and loose ratchet-wheels $H^5$ $H^6$, and springs $H^7$ $H^8$, connected to the driving and ratchet wheels, a shaft G on the main frame carrying driving-wheels $G'$ $G^2$, mechanism rotating the shaft G, endless chains J K, supported by idler and guide wheels on the frame $a$ and carriage H, and running, respectively, by their lower sides under the wheel $G'$ and over the wheel $G^2$, and running at their free upper sides over the carriage-wheels $H'$ $H^2$, and pawls $J'$ $K'$, fulcrumed to the carriage H and adapted to the ratchet-wheels $H^5$ $H^6$, and for operation from the net-gripping devices, substantially as herein set forth.

11. In a gill-net puller, the combination, with a main frame $a$, of a reciprocating carriage H thereon, a pair of net-gripping jaws held to shafts $A'$ $A'$, journaled to the carriage, said shafts having trip-pins $l$ $l'$, a frame I, fitted to slide in the carriage, and geared with the shafts $A'$ $A'$, to open and close the grip-jaws, independently-rotating shafts $H^3$ $H^4$ on the carriage H, and carrying, respectively, fixed driving-wheels $H'$ $H^2$, and loose ratchet-wheels $H^5$ $H^6$, and springs $H^7$ $H^8$, connected to the driving and ratchet wheels, a driving-shaft G on the main frame carrying sprocket-wheels $G'$ $G^2$, mechanism rotating the shaft G, endless chains J K, supported by idler and guide wheels on the main frame $a$ and carriage H, and running, respectively, by their lower sides under the wheel $G'$ and over the wheel $G^2$, and running by their free upper sides over the wheels $H'$ $H^2$, and pawls $J'$ $K'$, fulcrumed to the carriage H, and adapted to the ratchet-wheels and to be engaged and disengaged by the grip-shaft pins $l$ $l'$, all arranged for operation substantially as herein set forth.

12. In a gill-net puller, the combination, with the pulling-grip carriage and ratchet-wheels held to shafts driven in opposite directions on the carriage, and driving mechanism for said shafts, of reversely-set pawls hung to the carriage next the ratchet-wheels, and springs acting on the pawls to assure their free full engagement with and disengagement from their respective ratchet-wheels after the pawls receive initial movements by or through the medium of the net-gripping devices or their gearing, substantially as herein set forth.

13. In a gill-net puller, the combination, with the pulling-grip carriage and ratchet-wheels held to shafts driven in opposite directions on the carriage, and driving mechanism for said shafts, of reversely-set pawls hung to the carriage next the ratchet-wheels, springs acting on the pawls to assure their full engagement with and disengagement from the ratchet-wheels, and trip-pins on the pulling-grip acting on the pawls or on studs thereon to give reverse movements to the pawls as the grip opens and closes, substantially as herein set forth.

14. In a gill-net puller, the combination, with the pulling-grip carriage and ratchet-wheels held to shafts driven in opposite directions on the carriage, and driving mechanism for said shafts, of reversely-set pawls J' K', hung to the carriage, loops or staples $m$ on the pawls, pins $m^2$, held loosely to the staples and in the carriage, and springs M on the pins $m^2$, tilting the pawls either way, or to the ratchet-wheels or to stops on the carriage after the pawls receive initial overbalancing movements, substantially as herein set forth.

15. In a gill-net puller, the combination, with the pulling-grip carriage, and ratchet-wheels held to shafts driven in opposite directions on the carriage, and driving mechanism for said shafts, of reversely-set pawls J' K', hung to the carriage and having studs L, staples $m$ on the pawls, pins $m^2$, held loosely to the staples and in the carriage, springs M on the pins $m^2$, tilting the pawls to opposite extremes of movement to and from the ratchet-wheels, and trip-pins $l\,l'$ on the grip-jaw shafts acting on the studs L to give initial engaging or disengaging movements to the pawls, substantially as herein set forth.

16. In a gill-net puller, the combination, with a main frame $a$, of a reciprocating carriage H thereon, net-gripping jaws held to shafts A' A', journaled to the carriage, said shafts having trip-pins $l\,l'$, a frame I, sliding in the carriage H, and geared with the grip-jaws for opening and closing them, a rack and pawl locking the frame I when the jaws are closed on the net, springs normally sliding the frame one way to open the jaws when the frame-locking pawl is tripped, independently-rotating shafts $H^3\,H^4$ on the carriage H, provided, respectively, with fixed driving-wheels H' $H^2$ and loose ratchet-wheels $H^5\,H^6$, and springs $H^7\,H^8$, connected to the driving and ratchet wheels, a driving-shaft G on the main frame, carrying sprocket-wheels G' $G^2$, endless chains J K, supported by idler and guide wheels on the main frame $a$ and carriage H, and running, respectively, by their lower sides under the wheel G' and over the wheel $G^2$, and running by their free upper sides over the wheels H' $H^2$, pawls J' K', fulcrumed to the carriage H, and adapted to receive initial movements from the grip-jaw-shaft pins $l\,l'$, and springs on the pawls J' K', completing their reverse movements to the ratchet-wheels and to stops on the carriage, all arranged for operation substantially as herein set forth.

17. In a gill-net puller, the pulling-grip fitted to slide on the main frame and made with a carriage, grip-jaws journaled thereon, a sliding frame in the carriage geared with the grip-jaws, springs normally shifting the sliding frame to open the jaws, a stop which said frame strikes to close the jaws, and mechanism reciprocating the carriage, substantially as herein set forth.

18. In a gill-net puller, the pulling-grip fitted to slide on the main frame and made with a carriage, grip-jaws journaled thereon, a sliding frame in the carriage geared with the grip-jaws, springs normally shifting the sliding frame to open the jaws, a stop which said frame strikes to close the jaws, a rack and pawl locking the sliding frame when the jaws are closed on the net, and mechanism reciprocating the carriage, substantially as herein set forth.

19. In a gill-net puller, the pulling-grip fitted to slide on the main frame and made with a carriage, grip-jaws journaled thereon, a sliding frame in the carriage geared with the grip-jaws to open and close them, a rack and pawl locking the sliding frame when the jaws are closed on the net, and springs normally sliding the frame to open the jaws when the locking-pawl is tripped, substantially as herein set forth.

20. In a gill-net puller, the combination, with the main frame and the reciprocating pulling-grip thereon, of shafts A' A', journaled to the carriage and having gripping-jaws A A and gears $A^2\,A^2$, a sliding frame I, fitted in the carriage and geared with the grip-jaw shafts, a rack and pawl $i'$ I', holding the frame I to lock the jaws closed on the net, and springs normally sliding the frame to open the jaws, substantially as herein set forth.

21. In a gill-net puller, the combination, with the main frame and the reciprocating pulling-grip thereon having jaws A A and a sliding frame I, fitted in the pulling-grip carriage and geared with the jaws to open and close them, of a rack-bar $i'$ on the frame I, a pawl I' on the carriage locking the frame to hold the jaws closed, and tripping devices releasing the pawl I' as the pulling-grip reaches the end of its forward stroke, substantially as herein set forth.

22. In a gill-net puller, the combination, with the main frame, and the reciprocating pulling-grip thereon having jaws A A, and a sliding frame I in the pulling-grip carriage geared with the jaws to open and close them, of a rack-bar $i'$ on the frame I, a pawl I' on the carriage locking the frame to hold the jaws closed, a trip-rod and lever $I^2\,I^3$ on the carriage adapted to release the pawl I', a stop $i^3$ in the path of the lever $I^3$ at the limit of the forward stroke of the pulling-grip, and springs normally sliding the frame I to open the jaws A A when the pawl is tripped, substantially as herein set forth.

23. In a gill-net puller, the pulling-grip fitted to slide on the main frame and made with a carriage, grip-jaws journaled thereon, a sliding frame on the carriage geared with the grip-jaws, springs normally shifting the sliding frame to open the jaws, a stop which said frame strikes to close the jaws, said jaws closing on the net at a forwardly-converging angle, and mechanism reciprocating the carriage, substantially as herein set forth.

24. In a gill-net puller, the pulling-grip fitted to slide on the main frame and made with a carriage, grip-jaws journaled thereon, a sliding frame on the carriage geared with the grip-jaws, springs normally shifting the sliding frame to open the jaws, a stop which said frame strikes to close the jaws, said jaws closing on the net at a forwardly-converging angle and provided with eccentric rollers which hold the net with a gradually-tightening grip, and mechanism reciprocating the carriage, substantially as herein set forth.

25. In a gill-net puller, the combination, with the main frame, of a holding-grip thereon, consisting of a transverse frame, gripping-jaws having shafts journaled in the latter frame and closing at a rearwardly-converging angle, a sliding frame fitted in the transverse frame and geared with the grip-jaws to open and close them, springs normally sliding the frame forward to open the jaws, a plunger sliding the frame rearward to close the jaws, and a rack and pawl locking the sliding frame to hold the jaws closed on the net, substantially as herein set forth.

26. In a gill-net puller, the combination, with a main frame and a reciprocating pulling-grip thereon having a pair of gripping-jaws which close on the net at a forwardly-converging angle, of a holding-grip having a pair of gripping-jaws which reach toward the pulling-grip and close on the net at a rearwardly-converging angle, and mechanism actuating the pulling and holding grip jaws, substantially as herein set forth.

27. In a gill-net puller provided with a reciprocating pulling-grip, the net-holding grip made with a transverse frame N, provided with net-gripping jaws, a sliding frame O, fitted in the frame N and geared with the grip-jaws, a pawl N' on the frame N, a rack N² on the frame O, and mechanism, substantially as specified, for disengaging the pawl N' from the pulling-grip to allow opening of the holding-grip to release the net as the pulling-grip starts forward with the net, substantially as herein set forth.

28. In a gill-net puller provided with a reciprocating pulling-grip, the net-holding grip made with a transverse frame N, provided with gripping-jaws, a sliding frame O in the frame N, geared with the grip-jaws, a pawl N' on the frame N, a rack N² on the frame O, a shaft $p$ on the frame N, having a crank-arm at the pawl N', a bar P, hung to the main frame, connections, substantially as described, between the shaft $p$ and bar P, whereby as the latter is moved endwise and inward the shaft $p$ will disengage the pawl N' from the rack N², and a pawl on the pulling-grip carriage engaging the bar P to trip the pawl N' as the pulling-grip starts forward on its effective stroke, substantially as herein set forth.

29. In a gill-net puller provided with a reciprocating pulling-grip, the net-holding grip made with a transverse frame N, provided with gripping-jaws, a sliding frame O, fitted in the frame N and geared with the grip-jaws, a pawl N' on the frame N, a rack N² on the frame O, springs O' on the parts N O, normally sliding the frame O to open the grip-jaws, a shaft $p$ on the frame N, having a crank-arm at the pawl N', a bar P, hung to the main frame, connections, substantially as described, between the shaft $p$ and bar P, whereby as the latter is moved endwise and inward the shaft $p$ will disengage the pawl N' from the rack N², a pawl on the pulling-grip carriage engaging the bar P to trip the pawl N' as the pulling-grip starts forward with the net, and a bar O² on the holding-grip frame O giving a reverse movement to the bar P as the frame O opens the holding-grip, substantially as herein set forth.

30. In a gill-net puller, the combination, with the main frame and a reciprocating pulling-grip thereon made with a carriage H, grip-jaws thereon, and a sliding frame I, geared to open and close the jaws, of a holding-grip made with a frame N, grip-jaws thereon, and a sliding frame O, geared to open and close the holding-grip jaws, of a pawl N', adapted to lock the holding-grip jaws closed, a bar P, hung to the main frame, connections from said bar P to the pawl N' for disengaging it, a pawl on the pulling-grip carriage operating the bar P to disengage the pawl N', and a bar O² on the frame O restoring the bar P to normal position at the completion of the rearward movement of the frame O, substantially as herein set forth.

31. In a gill-net puller, the net-grips provided with eccentrically-set gripping-rollers held normally with their small radius presented to close on the net, and mechanism actuating the grip-jaws, substantially as herein set forth.

32. In a gill-net puller, the net-grips provided with spring-pressed arms or jaws yielding inward bodily to overcome outward resistance of the springs should excessive strains be brought on the jaws or net, and mechanism actuating the grip-jaws, substantially as herein set forth.

33. In a gill-net puller, the net-grips provided with spring-pressed gripping arms or jaws yielding inward bodily should excessive strains be brought on the jaws or net, said grip-arms provided with eccentrically-set gripping-rollers held normally with their small radius presented to close on the net, and mechanism actuating the grip-jaws, substantially as herein set forth.

34. In a gill-net puller, the net-gripping jaws made with a shaft A', arms or plates A³ A³ thereon, an eccentrically-set gripping-roller A⁶, journaled to the arms, and a spring held to one of said arms and to the roller, and normally holding the roller with its small radius presented to close on the net, substantially as herein set forth.

35. In a gill-net puller, the net-grips made with a shaft A', arms or plates A³ A³ held thereon, having back stops $a^6$, a resistancepiece $A^4$, held to the plates $A^3$, a spring placed between the parts $A'$ $A^4$, eccentrically-set gripping-rollers $A^6$, journaled to the arms $A^3$, and a spring held to one of said arms and to the roller and normally holding the latter with its small radius presented to close on the net, substantially as herein set forth.

36. In a gill-net puller, the combination, with a frame, a pulling-grip thereon, and mechanism actuating said grip, of a reel conveying the net from the pulling-grip and provided with yielding or spring-supported bars receiving the net, substantially as herein set forth.

37. In a gill-net puller, the combination, with the frame and a reciprocating net-pulling grip thereon, of a reel conveying the net from the grip, a ratchet chain-wheel $C^2$ $C^3$ on the pulling-grip carriage, a pawl $C^4$ on the carriage engaging the ratchet $C^3$, and a driving-chain guided over wheels on the main frame and engaging the wheel $C^2$, substantially as described, whereby the reel will be operated only on the effective stroke of the pulling-grip, as set forth.

38. In gill-net-pulling apparatus, the combination, with a frame or support, of a net-leading roller fulcrumed thereto for vertical oscillation, substantially as described, whereby the roller may be adjusted on its fulcrum to incline laterally to either side to control the lead of the net inboard, as set forth.

39. In gill-net-pulling apparatus, the outside net-leading roller hung for lateral oscillation to control the lead of the net inboard, and fitted with an operating-lever, combined with a latch-bar to which the lever is adapted, for holding the leading-roller inclined to starboard or port, substantially as herein set forth.

40. In gill-net-pulling apparatus, the outside net-leading roller made with upturned ends and comprising a central shaft or support, sleeves fitted for rotation on said shaft, and an outer covering for the sleeves, substantially as herein set forth.

41. In gill-net-pulling apparatus, the outside net-leading roller made with a central shaft or support, a wire incasement thereon, and a covering for said incasement, substantially as herein set forth.

42. In gill-net-pulling apparatus, the outside net-leading roller made with a central shaft or support having upturned ends, sleeves fitted to said shaft, a wire incasement placed on the sleeves, and a covering for said incasement, substantially as herein set forth.

43. In gill-net-pulling apparatus, the outside net-leading roller made with a central shaft or support having upturned ends, three sleeves fitted to said shaft and geared together for simultaneous rotation, and a covering for the sleeves, substantially as herein set forth.

44. In gill-net-pulling apparatus, the outside net-leading roller made with a central shaft or support having upturned ends, three sleeves fitted to said shaft and geared together for simultaneous rotation, a wire incasement on the sleeves, and a covering for said incasement, substantially as herein set forth.

45. In gill-net-pulling apparatus, the outside net-leading roller hung for lateral oscillation to control the lead of the net inboard and made with a central shaft or support having upturned ends, sleeves fitted on said shaft, and an outer covering for the sleeves, substantially as herein set forth.

46. In gill-net-pulling apparatus, the outside net-leading roller hung for lateral oscillation to control the lead of the net inboard and made with a central shaft or support having upturned ends, a wire incasement placed thereon, and a covering for said incasement, substantially as herein set forth.

47. In gill-net-pulling apparatus, the outside net-leading roller hung for lateral oscillation to control the lead of the net inboard and made with a central shaft or support having upturned ends, sleeves fitted to said shaft, a wire incasement placed around the sleeves, and a covering for the incasement, substantially as herein set forth.

48. In gill-net-pulling apparatus, the outside net-leading roller hung for lateral oscillation to control the lead of the net inboard and made with a central shaft or support having upturned ends, sleeves on said shaft geared together for simultaneous rotation, and a covering placed around said sleeves, substantially as herein set forth.

49. In gill-net-pulling apparatus, the outside net-leading roller hung for lateral oscillation to control the lead of the net inboard and made with a central shaft or support having upturned ends, sleeves on said shaft geared together for simultaneous rotation, a wire incasement around the sleeves, and a covering on said incasement, substantially as herein set forth.

50. In gill-net-pulling apparatus, the net-leading roller journaled in yielding or spring-supported bearings, a scale on the roller-frame, and a pointer on the roller-bearings, combined to indicate at the scale the pulling strain on the net, substantially as herein set forth.

51. In gill-net-pulling apparatus, the combination, with a net-pulling grip and a net-leading roller fulcrumed for vertical oscillation, of a roller having upturned ends and interposed between the leading-roller and pulling-grip, substantially as described, whereby the net will be guided from the leading-roller to the pulling-grip, as set forth.

52. In gill-net-pulling apparatus, comprising a net-pulling grip and an outside leading-roller, a net-guiding roller interposed between the leading-roller and pulling-grip, and having upturned ends and made with a central shaft or support, sleeves fitted thereon, and an outer covering for the sleeves, substantially as herein set forth.

53. In gill-net-pulling apparatus, comprising a net-pulling grip and an outside leading-roller, a net-guiding roller interposed between the leading-roller and pulling-grip, and having upturned ends and made with a central shaft or support, a wire incasement around it, and a covering for said incasement, substantially as herein set forth.

54. In gill-net-pulling apparatus, comprising a net-pulling grip and an outside leading-roller, a net-guiding roller interposed between the leading-roller and pulling-grip and having upturned ends and made with a central shaft or support, sleeves fitted thereon and geared together for simultaneous rotation, and an outer covering for the sleeves, substantially as herein set forth.

55. In gill-net-pulling apparatus, comprising a net-pulling grip and an outside leading-roller, a net-guiding roller interposed between the leading-roller and pulling-grip and having upturned ends made with a central shaft or support, sleeves fitted thereon and geared together for simultaneous rotation, a wire incasement on the sleeves, and an outer covering for the sleeves, substantially as herein set forth.

56. In a gill-net puller, the combination, with a main frame and a reciprocating pulling-grip thereon made with net-gripping devices, and a sliding frame or bar geared therewith for opening and closing them, of a cut-off placed on the main frame behind the pulling-grip and adjustable toward or from it to control the time of contact of the pulling-grip frame with it and the consequent closing of the grip devices on the net, and mechanism for actuating the same, substantially as herein set forth.

57. In a gill-net puller, the combination, with a main frame and a reciprocating pulling-grip thereon made with net-gripping devices, and a sliding frame or bar geared therewith for opening and closing them, of a cut-off consisting of a transverse frame or bar held adjustably to the main frame in the path of the pulling-grip sliding frame, pawls on the cut-off, racks on the main frame, to which the pawls are adapted, a disengaging device for the pawls, and mechanism for actuating the same, substantially as herein set forth.

58. In a gill-net puller, the combination, with a main frame, and a reciprocating pulling-grip thereon having net-gripping devices, and a sliding frame geared therewith for opening and closing them, and mechanism for actuating the same, of a cut-off comprising a frame S, adjustable on the main frame, pawls U on the frame S, racks V on the main frame, a shaft T, having arms $t$ next the pawls, and a lever W, linked to the shaft T, for operating it, substantially as herein set forth.

59. In a gill-net puller, the combination, with a main frame, and a reciprocating pulling-grip thereon made with net-gripping devices, and a sliding frame geared therewith for opening and closing them, and mechanism for actuating the same, of a cut-off placed on the main frame behind the pulling-grip and adjustable toward or from it to control the time of closing of the pulling-grip jaws on the net, and a roller placed on the adjustable cut-off and guiding the net to the pulling-grip, substantially as herein set forth.

ROBERT O'NEILL.

Witnesses:
GEORGE W. MILLER,
FRED A. SMITH.